(12) United States Patent
Klingsporn

(10) Patent No.: US 7,181,110 B2
(45) Date of Patent: *Feb. 20, 2007

(54) APPARATUS AND METHOD FOR COMBINING LIGHT FROM TWO OR MORE FIBERS INTO A SINGLE FIBER

(75) Inventor: Paul Edward Klingsporn, Lee's Summit, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/323,949

(22) Filed: Dec. 30, 2005

(65) Prior Publication Data

US 2006/0171636 A1    Aug. 3, 2006

(51) Int. Cl.
 *G02B 6/26* (2006.01)
(52) U.S. Cl. .............................. 385/45; 385/33; 385/39
(58) Field of Classification Search ................. 385/31, 385/33, 38, 44–46, 50
See application file for complete search history.

(56) References Cited

U.S. PATENT DOCUMENTS

| | | | |
|---|---|---|---|
| 6,707,965 B2* | 3/2004 | Gerber et al. | 385/33 |
| 2003/0081901 A1* | 5/2003 | Gage et al. | 385/48 |
| 2004/0017969 A1* | 1/2004 | Gardner et al. | 385/33 |

* cited by examiner

*Primary Examiner*—Michelle Connelly-Cushwa
(74) *Attorney, Agent, or Firm*—Hovey Williams LLP

(57) ABSTRACT

An apparatus and method for combining light signals carried on a plurality of input fibers onto a single receiving fiber with a high degree of efficiency. The apparatus broadly comprises the receiving fiber and a plurality of input fiber-lens assemblies, with each fiber lens assembly including an input fiber; a collimating lens interposed between the input fiber and the receiving fiber and adapted to collimate the light signal; and a focusing lens interposed between the collimating lens and the receiving fiber and adapted to focus the collimated light signal onto the face of the receiving fiber. The components of each fiber-lens assembly are oriented along an optic axis that is inclined relative to the receiving fiber, with the inclination angle depending at least in part on the input fiber's numerical aperture and the focal lengths and diameters of the collimating and focusing lenses.

9 Claims, 3 Drawing Sheets

APPARATUS AND METHOD FOR COMBINING LIGHT FROM TWO OR MORE FIBERS INTO A SINGLE FIBER

FEDERALLY SPONSORED RESEARCH OR DEVELOPMENT PROGRAM

The present invention was developed with support from the U.S. government under Contract No. DE-AC04-01AL66850 with the U.S. Department of Energy. Accordingly, the U.S. government has certain rights in the present invention.

RELATED APPLICATIONS

The present application is a nonprovisional patent application and claims priority benefit, with regard to all common subject matter, of earlier-filed U.S. nonprovisional patent application titled "APPARATUS AND METHOD FOR COMBINING LIGHT FROM TWO OR MORE FIBERS INTO A SINGLE FIBER", Ser. No. 10/777,561, filed Feb. 12, 2004. The identified earlier-filed application is hereby incorporated by reference into the present application.

BACKGROUND OF THE INVENTION

1. Field of the Invention

The present invention relates broadly to devices, apparatuses, systems, methods, and techniques for combining light from two or more optical fibers onto a single optical fiber. More particularly, the present invention concerns an apparatus and method for combining light signals carried on two or more input optical fibers onto a single receiving optical fiber. A plurality of fiber-lens arrangements, each comprising an input fiber, a collimating lens, and a focusing lens, are oriented along optic axes that are inclined relative to the receiving fiber, with the inclination angle depending at least in part on the input fibers' numerical aperture and the focal lengths and diameters of the collimating and focusing lenses.

2. Description of the Prior Art

It is often desirable to combine light signals carried on two or more input optical fibers onto a single receiving optical fiber of the same type and diameter. Various techniques are known in the prior art for combining light signals, with some relying, for example, on complex lens arrangements and others relying on light deflecting/transmitting assemblies using fibers of different diameters and numerical apertures. None accomplish the desired combination efficiently, however, in part because the light exiting the input fibers is divergent with an included angle of approximately 25° (corresponding to a standard fiber numerical aperture of 0.22). Thus, these prior art techniques are undesirably inefficient, preserving only a small percentage of the light of the light signals. Furthermore, apparatuses implementing these prior art techniques typically occupy or otherwise require an undesirably large amount of space, thereby prohibiting their use in space-limited applications.

Due to the above-identified and other problems and disadvantages in the prior art, a need exists for an improved apparatus for and method of combining light signals from multiple fibers onto a single receiving fiber.

SUMMARY OF THE INVENTION

The present invention overcomes the above-described and other problems and disadvantages in the prior art with an improved apparatus and method for combining light signals from multiple fibers onto a single fiber. The apparatus broadly comprises a plurality of input fiber-lens assemblies and a receiving fiber. Each input fiber lens assembly includes an input optical fiber; a collimating lens; and a focusing lens, all of which are oriented along an optic axis which is inclined by a particular inclination angle relative to the receiving fiber. The input fiber carries a light signal into the apparatus, while the receiving fiber receives and carries the light signal out of the apparatus. The collimating lens is interposed between the input fiber and the receiving fiber along the optic axis, and acts to collimate the light signal. The focusing lens is interposed between the input fiber and the receiving fiber along the optic axis following the collimating lens, and acts to focus the collimated light signal onto the face of the receiving fiber.

It will be appreciated that the apparatus and method of the present invention provide a number of substantial advantages over the prior art, including, for example, allowing for combining the multiple light signals onto the single receiving fiber with a higher degree of efficiency and using less space than is possible in the prior art, and using fibers of the same diameter and numerical aperture.

These and other important features of the present invention are more fully described in the section titled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

With reference to the figures, an apparatus 10 and method is herein described, shown, and otherwise disclosed in accordance with a preferred embodiment of the present invention. Broadly, the apparatus 10 is adapted and operable to combine light signals from multiple fibers onto a single fiber with a higher degree of efficiency and using less space than is possible with prior art techniques.

Figure 1:
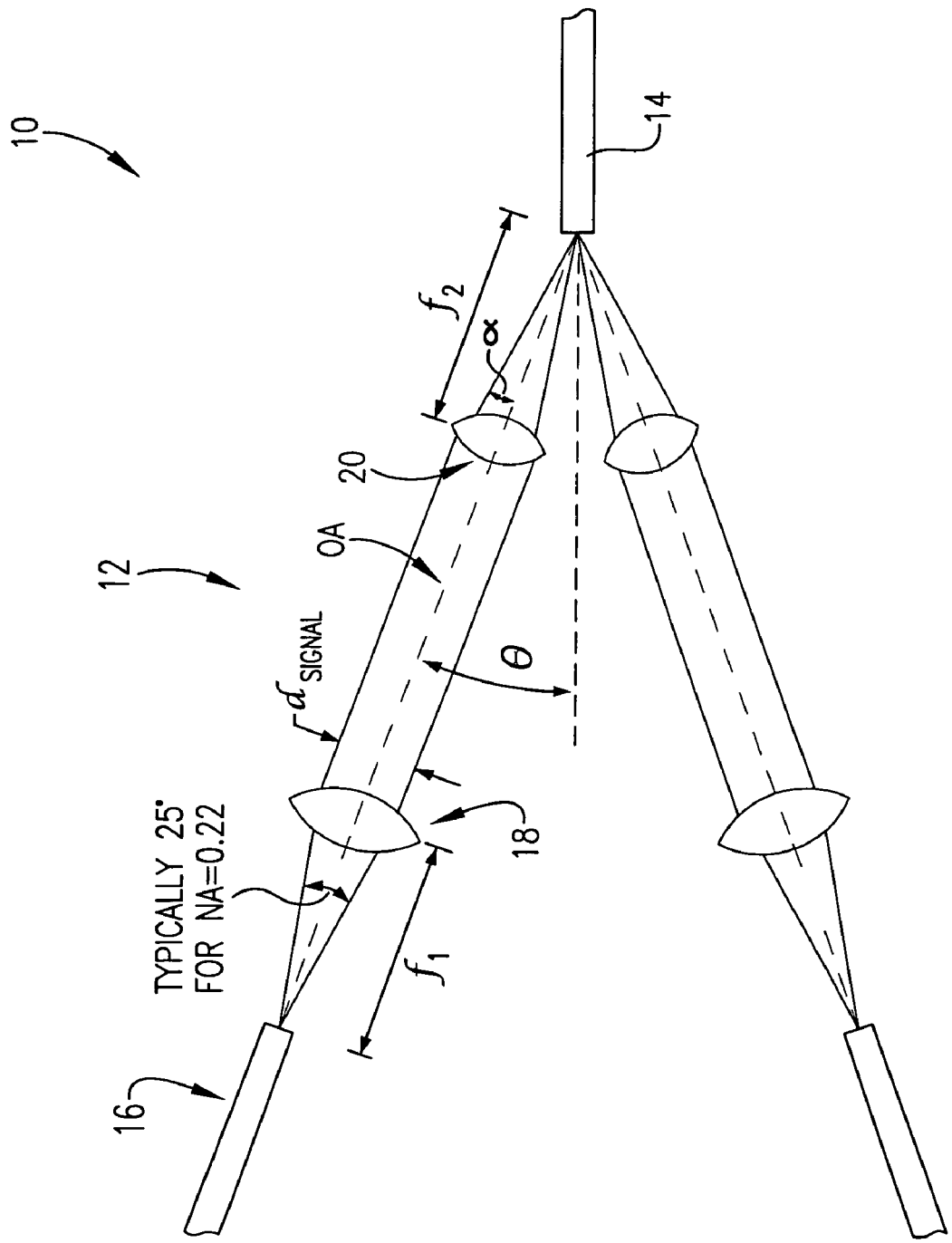
FIG. 1 is a fragmentary schematic plan view of a preferred embodiment of the apparatus of the present invention, wherein light signals from two input fibers can be combined onto a single receiving fiber.
Figure 2:
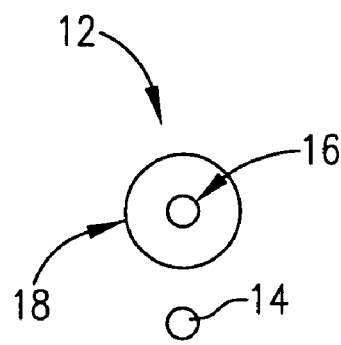
FIG. 2 is a schematic end view of the apparatus shown in FIG. 1.

Referring particularly to FIGS. 1 and 2, the apparatus 10 broadly comprises a plurality of input fiber-lens assemblies 12 and a receiving fiber 14. Each input fiber-lens assembly 12 includes an input optical fiber 16; a collimating lens 18; and a focusing lens 20, all of which are oriented along an optic axis, OA, which is inclined by a particular inclination angle, θ, relative to the receiving fiber 14. The input and receiving fibers 16,14 may be conventional optical fibers having the same or approximately the same diameters and numerical apertures, NA, (typically, NA=0.22).

The input fiber 16 carries a light signal into the apparatus 10, while the receiving fiber 14 receives and carries the light signal out of the apparatus 10. The collimating lens 18 is interposed between the input fiber 16 and the receiving fiber 14 along the optic axis OA, and acts to collimate the light signal. The collimating lens 18 may be a convergent lenses or, alternatively, a gradient index (GRIN) lens. The focal length, $f_1$, of the collimating lens 18 should be large in relation to the core diameter of the input fiber 16 so that the core diameter effectively becomes a point source. Furthermore, the diameter, $d_1$, of the collimating lens 18 should be large enough to collect the diverging light signal from the input fiber 16. Thus:

$$\arctan(d_1/2f_1) \geq \arcsin(NA)$$

The focusing lens 20 is interposed between the input fiber 16 and the receiving fiber 14 along the optic axis OA following the collimating lens 18, and acts to focus the collimated light signal onto the face of the receiving fiber 14. The converging angle, $\alpha$, of the focused light signal is a function of the diameter, $d_{signal}$, of the collimated light signal and the focal length, $f_2$, of the focusing lens 20:

$$\alpha = \arctan(d_{signal}/2f_2)$$

The diameter, $d_2$, of the focusing lens 20 should be slightly larger than $d_{signal}$, but this means that the smallest angle for $\theta$ is:

$$\theta = \arctan(d_2/2f_2)$$

In order to achieve maximum coupling of the light signal from the focusing lens 20 onto the receiving fiber 14, all of the light rays within the focused light signal must be incident on the face of the receiving fiber 14 at an angle not exceeding the NA of the receiving fiber 14. That is, the angles $\alpha$ and $\theta$ must obey the relation:

$$\alpha + \theta \leq \arcsin(NA)$$

The collimating and focusing lenses 18,20 should be chosen so that neither diffraction nor aberration is a limiting factor in the focused spot size of the light signal on the face of the receiving fiber 14. With regard to diffraction, $d_{signal}$ should be sufficiently large relative to $f_2$ so that the associated diffraction-limited spot size of the focused light signal is less than the core diameter of the receiving fiber 14. However, $d_{signal}$ relative to $f_2$ must be small enough so that spherical aberration associated with the focused spot size from the focusing lens 20 is substantially less than the core diameter of the receiving fiber 14.

Figure 3:
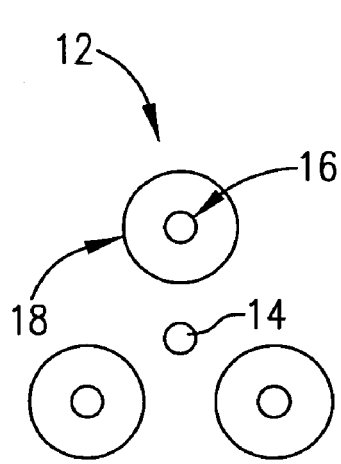
FIG. 3 is a schematic end view of the apparatus wherein light signals from three input fibers can be combined onto the single receiving fiber.
Figure 4:
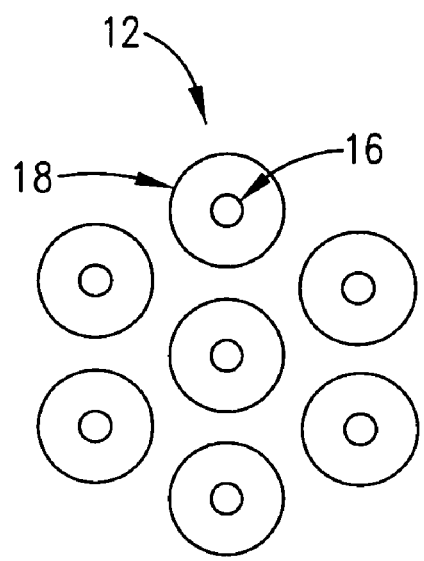
FIG. 4 is a schematic end view of the apparatus wherein light signals from seven input fibers can be combined onto the single receiving fiber.

It will be appreciated that the apparatus 10 of the present invention may be adapted to accommodate substantially any number of the input fiber-lens assemblies 12. By way of illustration and not limitation, two such assemblies 12 are shown in FIGS. 1 and 2; three assemblies 12 are shown in FIG. 3; and seven assemblies 12 are shown in FIG. 4. The seven assemblies 12 of FIG. 4 are an example of higher order close-packed hexagonal symmetry, wherein the optic axis of a central one of the assemblies 12 is coaxial with the receiving fiber 14 rather than inclined by $\theta$. For all other cases, the angular requirements expressed above must be met.

Figure 5:
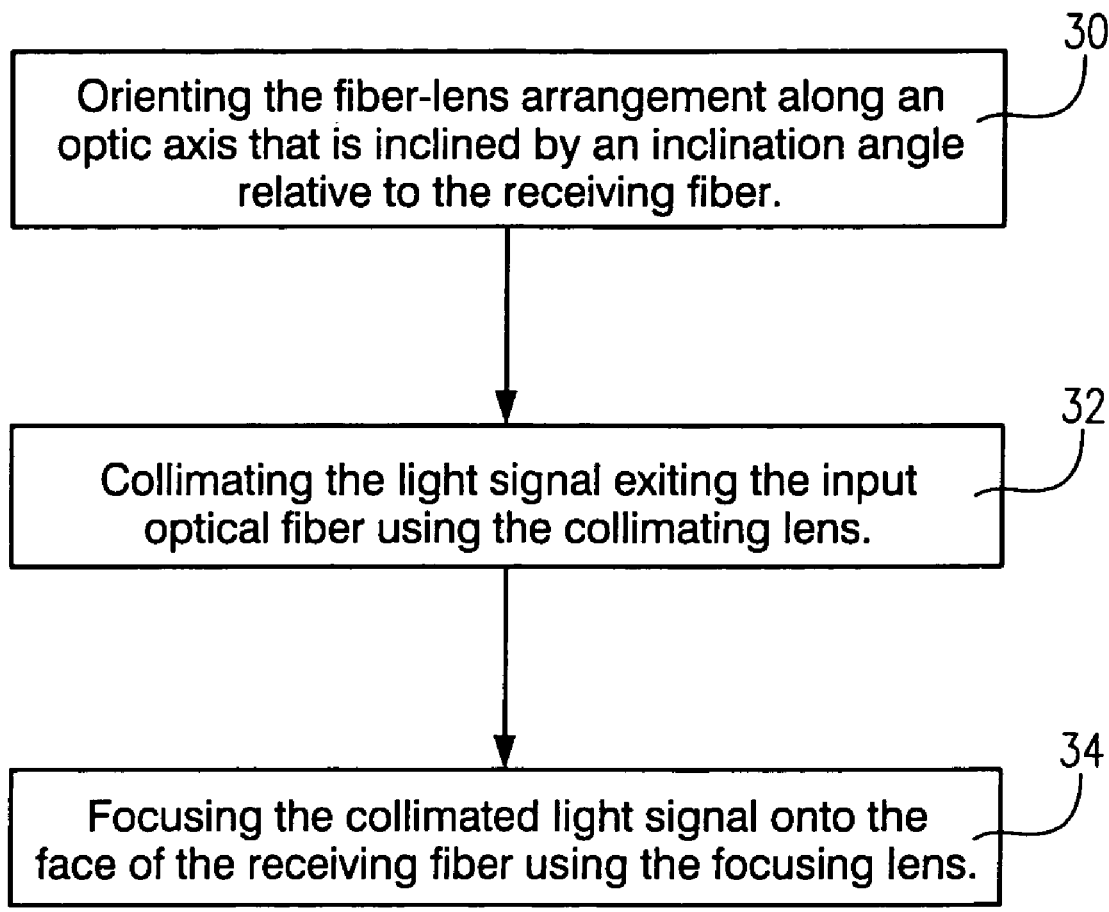
FIG. 5 is a flow diagram setting forth a series or preferred steps involved in the operation of the apparatus of the present invention.

In exemplary use and operation, referring particularly to FIG. 5, the apparatus 10 operates as follows. As mentioned, each fiber-lens assembly 12 is oriented along the optic axis OA which is inclined by $\theta$ relative to the receiving fiber 14, as depicted in box 30. For each fiber-lens assembly 12, as the light signal exits its input fiber 16 it diverges by a particular angle (typically, 25° for NA=0.22). The collimating lens 18 collimates the diverging light signal, as depicted in box 32, and the focusing lens 20 focuses the collimated light signal onto the face of the receiving fiber 14, as depicted in box 34. Thereafter the light signals exit the apparatus 10 via the receiving fiber 14.

It will be appreciated that the apparatus and method of the present invention has a variety of potential applications, including, for example, enhancing signal-to-noise ratios in fiber-based sensing systems; facilitating the design and implementation of simultaneous multi-component fiber sensing systems for chemical, physical, and biological variables; and for facilitating wavelength-division multiplexing (WDM) wherein each of the input fibers carries optical energy of a particular wavelength of interest.

From the preceding description it will be appreciated that the apparatus and method of the present invention provide a number of substantial advantages over the prior art, including, for example, allowing for combining the multiple light signals onto the single receiving fiber with a higher degree of efficiency using fibers all of the same diameter and numerical aperture and using less space than is possible in the prior art.

Although the invention has been described with reference to the preferred embodiments illustrated in the drawings, it is noted that equivalents may be employed and substitutions made herein without departing from the scope of the invention as recited in the claims. As mentioned, for example, the apparatus may be adapted to accommodate substantially any desired number of fiber-lens arrangements.

Having thus described the preferred embodiment of the invention, what is claimed as new and desired to be protected by Letters Patent includes the following:

1. An apparatus for combining multiple light signals, the apparatus comprising:
  a receiving optical fiber;
  an input optical fiber adapted to carry a light signal, wherein the input optical fiber is oriented along an optic axis having an inclination angle relative to the receiving optical fiber;
  a collimating lens interposed along the optic axis between the input optical fiber and the receiving fiber and adapted to collimate the light signal; and
  a focusing lens interposed along the optic axis between the collimating lens and the receiving fiber and adapted to focus the collimated light signal onto the receiving fiber,
  wherein the collimated light signal has a signal diameter, the focusing lens has a focal length, and the focused light signal has a convergence angle, and wherein the convergence angle is equal to arctan(the signal diameter/(2 * the focal length)).

2. The apparatus as set forth in claim 1, wherein the collimating lens is a convergent lens.

3. The apparatus as set forth in claim 1, wherein the collimating lens is a gradient index lens.

4. A method of combining multiple light signals, the method comprising the steps of:
  (a) orienting an input optical fiber along an optic axis having an inclination angle relative to a receiving optical fiber, wherein the input optical fiber carries a light signal;
  (b) collimating the light signal using a collimating lens, wherein the collimated light signal has a signal diameter; and (c) focusing the collimated light signal onto the receiving optical fiber using a focusing lens, wherein the focusing lens has a focal length and the focused light signal has a convergence angle, and wherein the convergence angle is equal to arctan(the signal diameter/(2 * the focal length)).

5. The method as set forth in claim 4, wherein the collimating lens is a convergent lens.

6. The method as set forth in claim 4, wherein the collimating lens is a gradient index lens.

7. A method of facilitating combining multiple light signals, the method comprising the steps of:
(a) providing a receiving optical fiber;
(b) providing an input optical fiber adapted to carry a light signal;
(c) orienting the input optical fiber along an optic axis having an inclination angle relative to the receiving optical fiber;
(d) interposing a collimating lens along the optic axis between the input optical fiber and the receiving optical fiber for collimating the light signal, wherein the collimated light signal has a signal diameter; and
(e) interposing a focusing lens along the optic axis between the input optical fiber and the receiving fiber after the collimating lens, for focusing the light signal into the receiving fiber, wherein the focusing lens has a focal length and the focused light signal has a convergence angle, and wherein the convergence angle is equal to arctan(the signal diameter/(2 * the focal length)).

8. The method as set forth in claim 7, wherein the collimating lens is a convergent lens.

9. The method as set forth in claim 7, wherein the collimating lens is a gradient index lens.

* * * * *

UNITED STATES PATENT AND TRADEMARK OFFICE
CERTIFICATE OF CORRECTION

| | | |
|---|---|---|
| PATENT NO. | : 7,181,110 B2 | Page 1 of 1 |
| APPLICATION NO. | : 11/323949 | |
| DATED | : February 20, 2007 | |
| INVENTOR(S) | : Paul Edward Klingsporn | |

It is certified that error appears in the above-identified patent and that said Letters Patent is hereby corrected as shown below:

On the Title Page, insert:

--Related U.S. Application Data

(63) Continuation of application No. 10/777,561, filed on Feb. 12, 2004, now Pat. No. 7,013,068.--

Signed and Sealed this

Twelfth Day of October, 2010

David J. Kappos
*Director of the United States Patent and Trademark Office*